US012658416B2

(12) United States Patent
Denny et al.

(10) Patent No.: US 12,658,416 B2
(45) Date of Patent: Jun. 16, 2026

(54) METHODS OF CALIBRATING A MASS SPECTROMETER

(71) Applicant: WATERS TECHNOLOGIES IRELAND LTD, Dublin (IE)

(72) Inventors: Richard Denny, Dublin (IE); Maria Gaffney-Lovett, Dublin (IE)

(73) Assignee: WATERS TECHNOLOGIES IRELAND LTD, Dublin (IE)

( * ) Notice: Subject to any disclaimer, the term of this patent is extended or adjusted under 35 U.S.C. 154(b) by 271 days.

(21) Appl. No.: 18/022,008

(22) PCT Filed: Aug. 20, 2021

(86) PCT No.: PCT/EP2021/073185
§ 371 (c)(1),
(2) Date: Feb. 17, 2023

(87) PCT Pub. No.: WO2022/038280
PCT Pub. Date: Feb. 24, 2022

(65) Prior Publication Data
US 2023/0377858 A1 Nov. 23, 2023

(30) Foreign Application Priority Data
Aug. 20, 2020 (GB) ...................................... 2013007

(51) Int. Cl.
*H01J 49/00* (2006.01)

(52) U.S. Cl.
CPC ................................ *H01J 49/0009* (2013.01)

(58) Field of Classification Search
CPC ... H01J 49/0009; H01J 49/429; H01J 49/4205
See application file for complete search history.

(56) References Cited

U.S. PATENT DOCUMENTS

2013/0334415 A1* 12/2013 Sugawara ........... H01J 49/4215 250/288

FOREIGN PATENT DOCUMENTS

EP 2672506 A1 12/2013
GB 2405991 A * 3/2005 .......... H01J 49/0027

OTHER PUBLICATIONS

International Search Report and Written Opinion for International Patent Application No. PCT/EP2021/073185, mailed Nov. 16, 2021.

(Continued)

*Primary Examiner* — Uzma Alam
*Assistant Examiner* — Gisselle M Gutierrez
(74) *Attorney, Agent, or Firm* — Goodwin Procter LLP

(57) ABSTRACT

Methods of calibrating a mass spectrometer include: experimentally determining the mass to charge ratios of a plurality of chemical compounds in a reference standard using a mass spectrometer configured to scan ions at a first scan speed; experimentally determining the mass to charge ratios of said plurality of chemical compounds in said reference standard using a mass spectrometer configured to scan ions at a second scan speed; generating sets of data corresponding to each chemical compound, each set of data comprising the experimentally determined mass to charge ratios and the first and second scan speeds; interpolating from the sets of data mass to charge ratio for each chemical compound at a scan speed different from the first and second scan speeds; and constructing a calibration curve using the mass to charge ratios interpolated from the sets of data.

6 Claims, 4 Drawing Sheets

(56) References Cited

OTHER PUBLICATIONS

Search Report for United Kingdom Patent Application No. GB2111970.6, mailed Jan. 26, 2022.

* cited by examiner

METHODS OF CALIBRATING A MASS SPECTROMETER

CROSS-REFERENCE TO RELATED APPLICATIONS

This application is a U.S. national phase filing claiming the benefit of and priority to International Patent Application No. PCT/EP2021/073185, filed Aug. 8, 2021, which claims priority from and the benefit of United Kingdom Patent Application No. 2013007.6, filed Aug. 20, 2020. The entire contents of these applications are incorporated herein by reference.

FIELD

This invention relates to methods of calibrating a mass spectrometer which involve experimentally determining the mass to charge ratios of a plurality of chemical compounds in a reference standard using a mass spectrometer at first and second scan speeds; interpolating mass to charge ratios for each of the chemical compounds at a scan speed different from the first and second scan speeds; and constructing a calibration curve using the interpolated mass to charge ratios. The interpolating step may be carried out using probabilistic methods.

BACKGROUND

Mass spectrometers require regular mass calibration and this is almost always done by constructing a calibration curve based on the mass spectrum of a known reference standard which typically includes a plurality of chemical compounds having different masses. Mass calibration is required for many reasons, including, but not limited to, changes in performance caused by subtle changes in the electronics of a spectrometer or conditions—such as the temperature, humidity or cleanliness—in the room in which the spectrometer is located. Therefore constant monitoring is needed to ensure consistent high mass accuracy.

GB2405991 describes a known method of calibrating a mass spectrometer which involves experimentally determining the mass to charge ratios of a plurality of chemical compounds in a reference standard. FIG. 1 of GB2405991 depicts a calibration curve which shows the experimentally determined mass to charge ratio (Measured y) as a function of the expected mass to charge ratio (True x) for four chemical compounds in a reference standard. FIG. 2 of GB2405991 depicts the same data but this time shows the offset between the measured value and the true value as a function of the true value. Using either of these calibration curves it is possible to determine the true value for any measured value obtained using the mass spectrometer on which the calibration was performed. The calibration curve may be constructed using probabilistic methods, for example as described in GB2405991, or by using more conventional methods, such as least squares regression. In experiments, true values can then be obtained from the calibration curve for any given measured value.

It has been found that the mass calibration of a mass spectrometer is heavily dependent on the scan speed, i.e. the time the analyser spends scanning for ions. Scan speeds are typically quoted in Da/e/s, where: "Da" represents a unit of mass; "e" represents the elementary charge; and "s" represents the time in seconds.

Dependence on scan speed is particularly pertinent in cases where the mass spectrometer has a quadrupole or ion trap mass analyser.

In order to illustrate the dependence on scan speed reference is made to the following figures, in which:

FIG. 1 shows two calibration curves constructed from data obtained using relatively low scan speeds: 50 Da/e/s and 2000 Da/e/s; and FIG. 2 shows three calibration curves constructed from data obtained using relatively high scan speeds: 10,000 Da/e/s; 15,000 Da/e/s and 20,000 Da/e/s.

FIG. 1 and FIG. 2 show various calibration curves which are intended to demonstrate that the mass calibration of a mass spectrometer is dependent on the scan speed. These data were obtained on the same reference standard under identical conditions with the only variable being the scan speed. The reference standard contained 23 chemical compounds having known masses. The calibration curves show the offset between the measured mass to charge ratio and the true mass to charge ratio (y-axis) as a function of the true mass to charge ratio (x-axis). This format is the same as illustrated by FIG. 2 of GB2405991.

FIG. 1 shows two calibration curves constructed from data obtained using scan speeds of 50 Da/e/s (squares) and 2000 Da/e/s (triangles) and FIG. 2 shows three calibration curves constructed from data obtained using scan speeds of 10000 Da/e/s (squares), 15000 Da/e/s (diamonds) and 20000 Da/e/s/(triangles). Data corresponding to FIGS. 1 and 2 are also depicted in tables 1 and 2, respectively. Note that the software did not observe a peak for the 487.166 reference mass in the data corresponding to the 2000 Da/e/s scan speed.

TABLE 1

| | Scan speed | | | |
|---|---|---|---|---|
| | 50 | | 2000 | |
| Ref mass | Obs-Ref | Error bar | Obs-Ref | Error bar |
| 74.097 | −0.153 | 0.045 | −0.046 | 0.042 |
| 163.061 | −0.071 | 0.046 | −0.018 | 0.059 |
| 289.092 | −0.133 | 0.011 | −0.101 | 0.016 |
| 311.081 | −0.150 | 0.007 | −0.114 | 0.007 |
| 325.114 | −0.159 | 0.051 | −0.121 | 0.072 |
| 455.291 | −0.229 | 0.003 | −0.185 | 0.003 |
| 487.166 | −0.230 | 0.021 | | |
| 556.277 | −0.278 | 0.010 | −0.238 | 0.013 |
| 577.177 | −0.296 | 0.018 | −0.259 | 0.025 |
| 649.219 | −0.308 | 0.029 | −0.250 | 0.047 |
| 811.272 | −0.379 | 0.025 | −0.353 | 0.045 |
| 865.261 | −0.398 | 0.006 | −0.340 | 0.009 |
| 973.325 | −0.434 | 0.032 | −0.358 | 0.036 |
| 1122.000 | −0.540 | 0.018 | −0.470 | 0.026 |
| 1221.990 | −0.550 | 0.010 | −0.460 | 0.015 |
| 1321.980 | −0.620 | 0.014 | −0.530 | 0.020 |
| 1421.980 | −0.690 | 0.015 | −0.580 | 0.020 |
| 1521.970 | −0.710 | 0.016 | −0.590 | 0.020 |
| 1621.970 | −0.760 | 0.018 | −0.620 | 0.026 |
| 1721.960 | −0.830 | 0.028 | −0.670 | 0.035 |
| 1821.950 | −0.830 | 0.029 | −0.690 | 0.035 |
| 1921.950 | −0.840 | 0.031 | −0.690 | 0.043 |
| 2017.600 | −0.830 | 0.010 | −0.610 | 0.011 |

TABLE 2

| Ref mass | Scan speed 10000 Obs-Ref | 10000 Error bar | 15000 Obs-Ref | 15000 Error bar | 20000 Obs-Ref | 20000 Error bar |
|---|---|---|---|---|---|---|
| 74.097 | 0.013 | 0.032 | −0.096 | 0.035 | 0.021 | 0.035 |
| 163.061 | −0.146 | 0.068 | −0.395 | 0.070 | −0.406 | 0.109 |
| 289.092 | −0.337 | 0.015 | −0.678 | 0.024 | −0.812 | 0.025 |
| 311.081 | −0.331 | 0.014 | −0.679 | 0.016 | −0.823 | 0.025 |
| 325.114 | −0.335 | 0.094 | −0.673 | 0.102 | −0.780 | 0.124 |
| 455.291 | −0.480 | 0.011 | −0.885 | 0.012 | −1.096 | 0.021 |
| 487.166 | −0.489 | 0.032 | −0.886 | 0.035 | −1.129 | 0.053 |
| 556.277 | −0.539 | 0.014 | −0.953 | 0.033 | −1.166 | 0.035 |
| 577.177 | −0.574 | 0.047 | −0.984 | 0.047 | −1.202 | 0.077 |
| 649.219 | −0.602 | 0.054 | −1.066 | 0.053 | −1.286 | 0.074 |
| 811.272 | −0.670 | 0.031 | −1.146 | 0.039 | −1.480 | 0.060 |
| 865.261 | −0.723 | 0.020 | −1.201 | 0.021 | −1.500 | 0.033 |
| 973.325 | −0.720 | 0.044 | −1.249 | 0.043 | −1.601 | 0.071 |
| 1122.000 | −1.000 | 0.046 | −1.580 | 0.041 | −1.900 | 0.053 |
| 1221.990 | −1.000 | 0.025 | −1.560 | 0.022 | −1.920 | 0.029 |
| 1321.980 | −1.070 | 0.025 | −1.650 | 0.023 | −2.010 | 0.029 |
| 1421.980 | −1.100 | 0.026 | −1.670 | 0.022 | −2.030 | 0.031 |
| 1521.970 | −1.110 | 0.027 | −1.680 | 0.024 | −2.010 | 0.036 |
| 1621.970 | −1.120 | 0.027 | −1.660 | 0.023 | −2.010 | 0.037 |
| 1721.960 | −1.120 | 0.038 | −1.670 | 0.032 | −1.970 | 0.050 |
| 1821.950 | −1.130 | 0.037 | −1.700 | 0.033 | −2.000 | 0.042 |
| 1921.950 | −1.120 | 0.041 | −1.580 | 0.030 | −1.810 | 0.043 |
| 2017.600 | −0.790 | 0.027 | −1.350 | 0.026 | −1.600 | 0.031 |

It is clear from FIGS. 1 and 2 that the mass calibration curves vary with scan speed and that this variation is more pronounced at higher scan speeds (note that the upper and lower limits of the y-axis scale of FIG. 2 are greater than those of FIG. 1). This means that a calibration curve obtained using a particular scan speed can only, in isolation, be useful for accurately calibrating experimental data that has been obtained using the same scan speed. Put another way, trying to calibrate experimental data using only a calibration curve that has been carried out at a different scan speed to the experimental data will not lead to high mass accuracy when interpreting the experimental data. Accordingly, prior to the present invention, the only way to ensure high mass accuracy was to ensure that both the calibration curve and the experiments were carried out using the same scan speed. This has associated therewith various issues. For instance, a user may wish to conduct many experiments in a single day using a variety of different scan speeds and it may not be practical (e.g. it may be too time consuming) to carry out a calibration at each of those scan speeds. There exists a need to improve the efficiency in which mass spectrometers can be calibrated.

A problem with known mass calibration methods is that they do not account for scan speed. As highlighted, ignoring scan speed can cause errors in obtaining true values from a calibration curve where an experiment is performed using a scan speed that differs from the scan speed that was used to perform the calibration.

It is, therefore, a non-exclusive aim of the invention to overcome, or at least substantially reduce, the aforementioned problems.

SUMMARY

According to a first aspect of the invention there is provided a method of calibrating a mass spectrometer comprising:

experimentally determining the mass to charge ratios of a plurality of chemical compounds in a reference standard using a mass spectrometer configured to scan ions at a first scan speed;

experimentally determining the mass to charge ratios of said plurality of chemical compounds in said reference standard using a mass spectrometer configured to scan ions at a second scan speed;

generating sets of data corresponding to each chemical compound, each set of data comprising the experimentally determined mass to charge ratios and the first and second scan speeds;

interpolating from the sets of data a mass to charge ratio for each chemical compound at a scan speed different from the first and second scan speeds; and constructing a calibration curve using the mass to charge ratios interpolated from the sets of data.

The method may comprise:

experimentally determining the mass to charge ratios of said plurality of chemical compounds in said reference standard using a mass spectrometer configured to scan ions at a third scan speed;

generating sets of data corresponding to each chemical compound, each set of data comprising the experimentally determined mass to charge ratios and the first, second and third scan speeds;

interpolating from the sets of data a mass to charge ratio for each chemical compound at a scan speed different from the first, second and third scan speeds; and constructing a calibration curve using the mass to charge ratios interpolated from the sets of data.

The interpolating step may be performed using probabilistic methods.

The calibration curve may be constructed using probabilistic methods.

The method may comprise experimentally determining the mass to charge ratios of at least three (e.g. three) chemical compounds in the reference standard at each scan speed.

According to a second aspect of the invention there is provided a mass spectrometer having associated therewith a computer for performing data analysis functions of data produced by the mass spectrometer, the computer performing the method of the first aspect of the invention.

The invention is particularly advantageous in quadrupole mass spectrometers. However, the present invention may also be useful in other types of mass spectrometer.

The mass spectrometer may further comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAN") ion source; and (xxvi) a Solvent Assisted Inlet Ionisation ("SAN") ion source; and/or (b) one or more continuous or pulsed ion sources; and/or (c) one or more ion guides; and/or (d) one or more ion mobility separation devices and/or (e) one or more Field Asymmetric Ion Mobility Spectrometer devices; and/or (f) one or more ion traps or one or more ion trapping regions; and/or (g) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (h) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (i) one or more energy analysers or electrostatic energy analysers; and/or (j) one or more ion detectors; and/or (k) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (l) a device or ion gate for pulsing ions; and/or (m) a device for converting a substantially continuous ion beam into a pulsed ion beam.

The mass spectrometer may also comprise a chromatography or other separation device upstream of an ion source.

In some embodiments, the chromatography separation device may comprise a liquid chromatography or gas chromatography device.

In some embodiments, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

BRIEF DESCRIPTION OF THE FIGURES

Embodiments of the invention will now be described, by way of example only, with reference to the following figures, in which.

DESCRIPTION OF EMBODIMENTS

Figure 1:
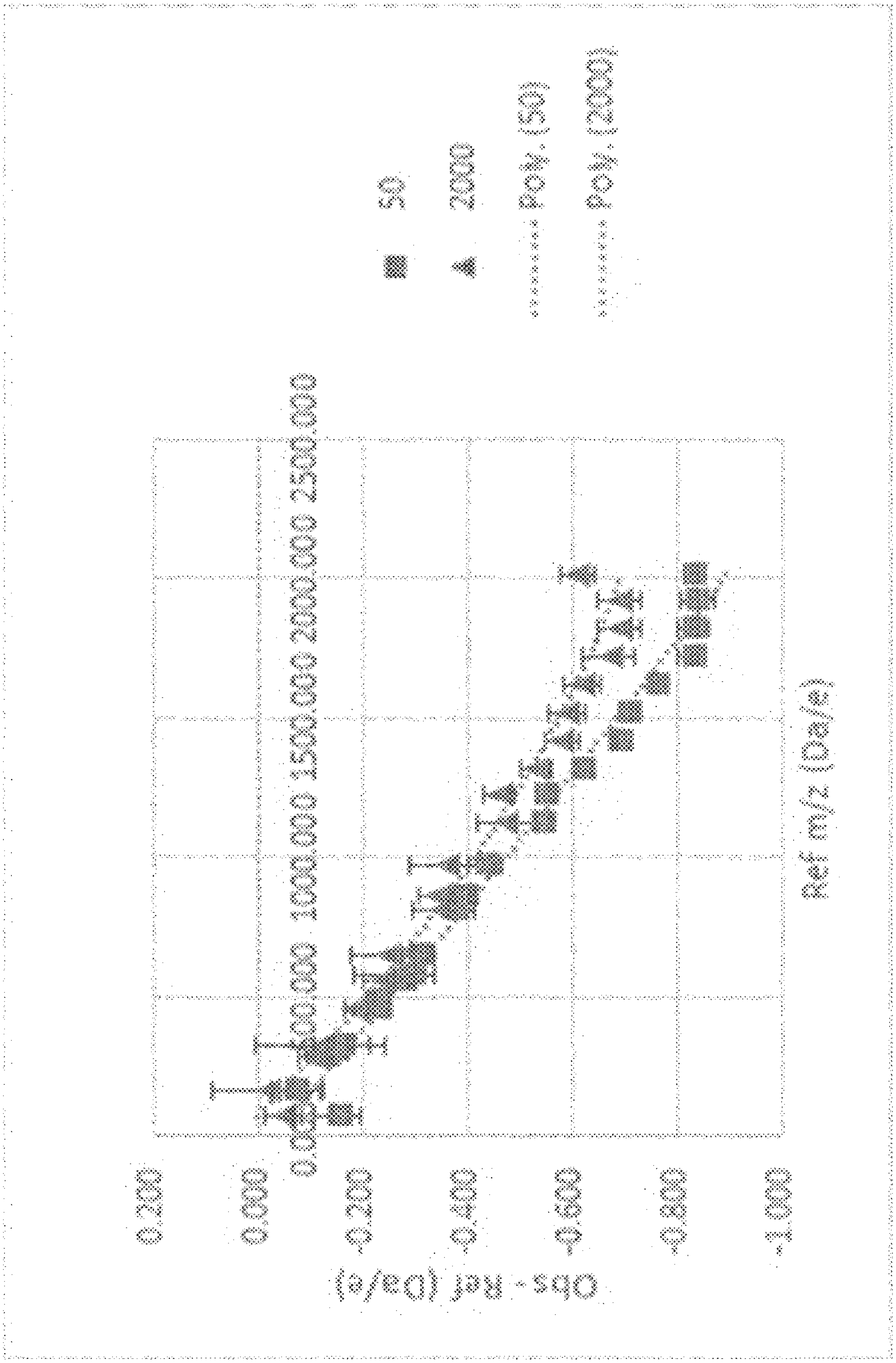
FIG. 1 shows two calibration curves constructed from data obtained using relatively low scan speeds and known calibration methods.
Figure 2:
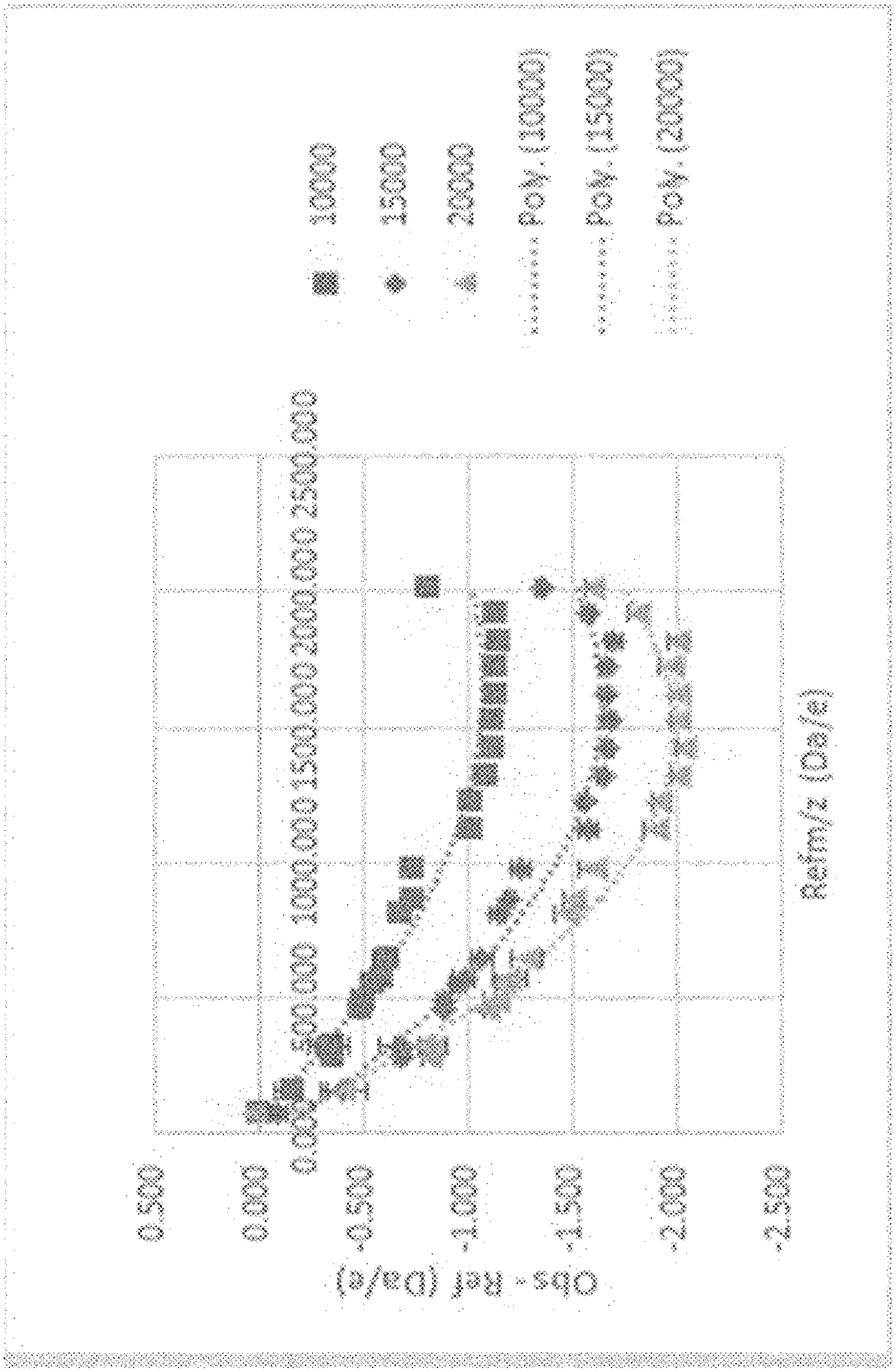
FIG. 2 shows two calibration curves constructed from data obtained using relatively high scan speeds and known calibration methods.
Figure 3:
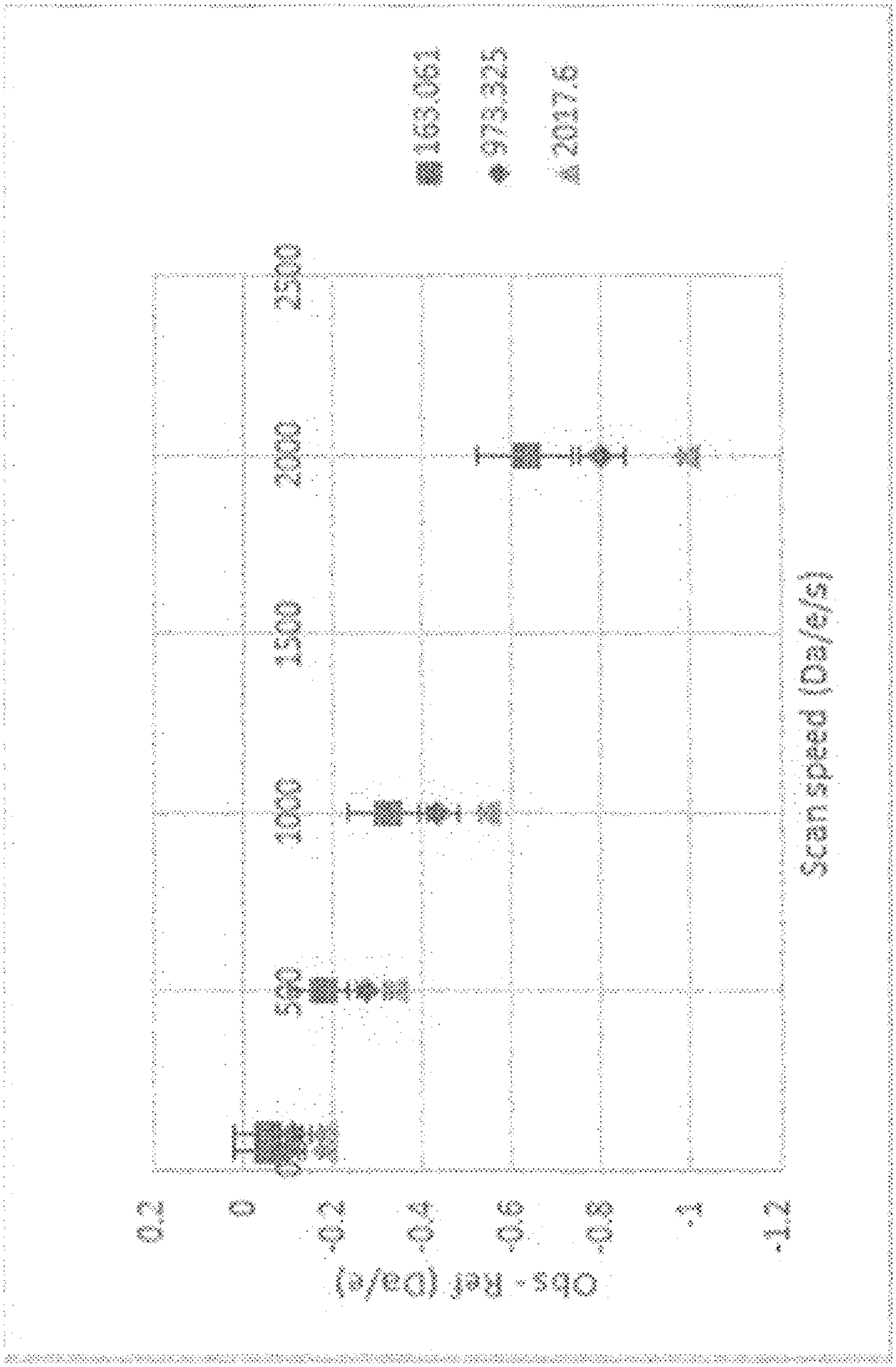
FIG. 3 shows sets of data generated in accordance with an embodiment of the invention.
Figure 4:
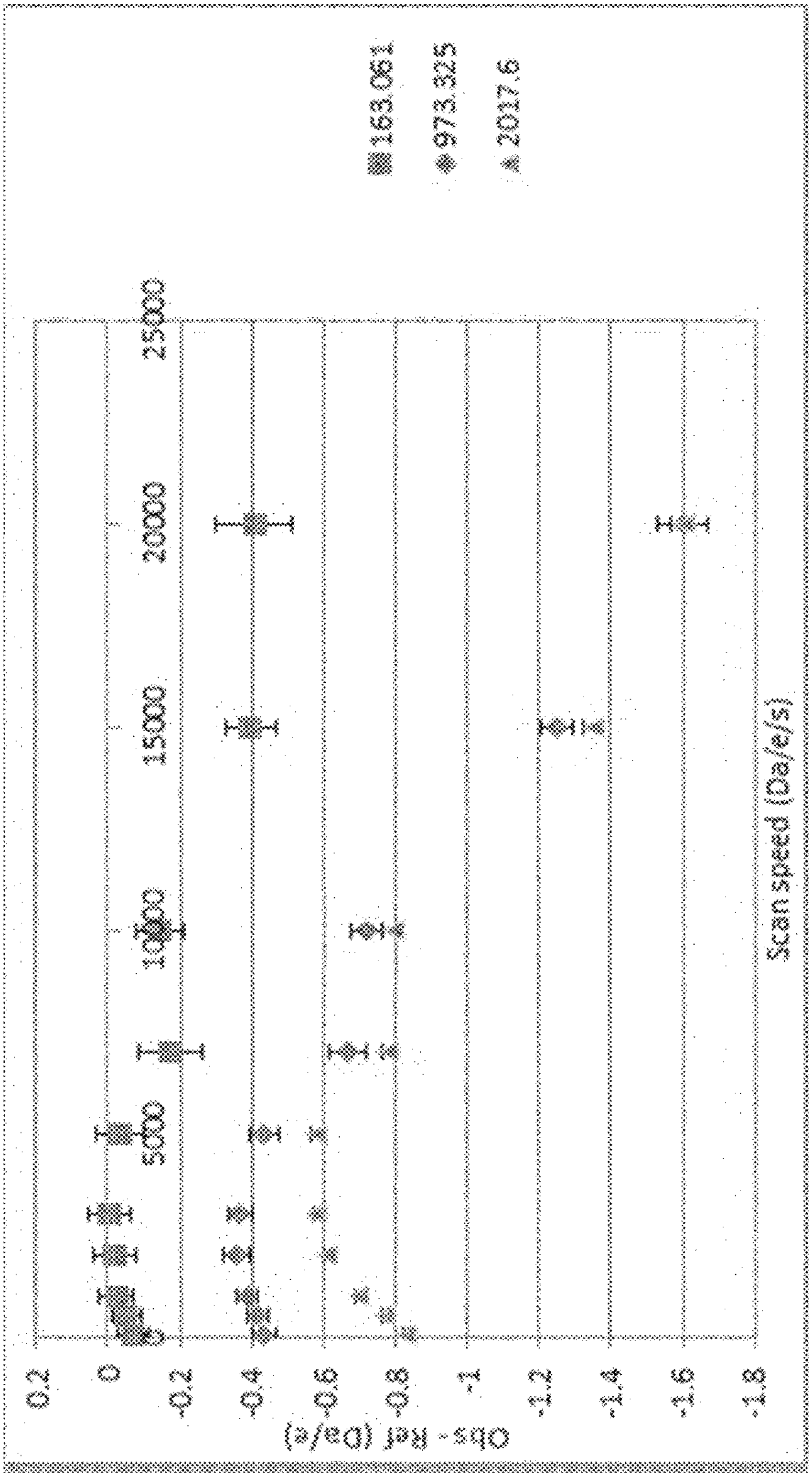
FIG. 4 shows sets of data generated in accordance with an embodiment of the invention.

FIG. 3 and FIG. 4 show sets of data generated in accordance with embodiments of the invention. These sets of data were obtained using the same reference standard that was used in relation to FIGS. 1 and 2, although in other embodiments a selection of different chemical compounds in the same or a different reference standard could be used equally effectively. The chemical compounds having mass to charge ratios of 163.061, 973.325 and 2017.6 have been used to explain the invention.

FIG. 3 shows three sets of data corresponding to the mass to charge ratios of the three chemical compounds. The sets of data are plots of the offset between the measured mass to charge ratio and the true mass to charge ratio for each chemical compound (y-axis) as a function of scan speed (x-axis). In other embodiments, the sets of data could be plots of the measured mass to charge ratio (rather than the offset) as a function of scan speed. The mass to charge ratios were measured experimentally for the three chemical compounds at five scan speeds: 50 Da/e/s, 100 Da/e/s, 500 Da/e/s, 1000 Da/e/s and 2000 Da/e/s.

Each set of data was interpolated to estimate a mass to charge ratio for a scan speed other than one of the five scan speeds that were used to create the sets of data. The chosen scan speed could be any scan speed (e.g. 1500 Da/e/s) from which the user wishes to obtain a calibration curve. Interpolating the sets of data provides estimated mass to charge ratios for the three chemical compounds at the chosen scan speed. A calibration curve (not shown) utilising the estimated mass to charge ratios at the chosen scan speed was constructed.

FIG. 4 shows three sets of data corresponding to the mass to charge ratios of the same three chemical compounds. Again, the sets of data are plots of the offset between the measured mass to charge ratio and the true mass to charge ratio for each chemical compound (y-axis) as a function of scan speed (x-axis). In other embodiments, the sets of data could be plots of the measured mass to charge ratio (rather than the offset) as a function of scan speed. The mass to charge ratios were measured experimentally for the three chemical compounds at ten scan speeds: 50 Da/e/s, 500 Da/e/s, 1000 Da/e/s, 2000 Da/e/s, 3000 Da/e/s, 5000 Da/e/s, 7000 Da/e/s, 10000 Da/e/s, 15000 Da/e/s and 20000 Da/e/s.

Each set of data was interpolated to estimate a mass to charge ratio for a scan speed other than one of the ten scan speeds that were used to create the sets of data. The chosen scan speed could be any scan speed (e.g. 1500 Da/e/s) from which the user wishes to obtain a calibration curve. Interpolating the sets of data provides estimated mass to charge ratios for the three chemical compounds at the chosen scan speed. A calibration curve (not shown) utilising the estimated mass to charge ratios at the chosen scan speed was constructed.

Data corresponding to FIGS. 3 and 4 are also depicted in tables 3 and 4, respectively.

TABLE 3

| Scan | Ref m/z | | | | | |
|---|---|---|---|---|---|---|
| | 163.061 | | 973.325 | | 2017.6 | |
| speed | Obs-Ref | Error bar | Obs-Ref | Error bar | Obs-Ref | Error bar |
| 50 | −0.052 | 0.071 | −0.099 | 0.035 | −0.180 | 0.009 |
| 100 | −0.054 | 0.076 | −0.113 | 0.036 | −0.180 | 0.009 |
| 500 | −0.179 | 0.076 | −0.275 | 0.043 | −0.340 | 0.011 |
| 1000 | −0.321 | 0.090 | −0.436 | 0.045 | −0.540 | 0.012 |
| 2000 | −0.629 | 0.107 | −0.800 | 0.052 | −0.990 | 0.015 |

TABLE 4

| Scan | Ref m/z | | | | | |
|---|---|---|---|---|---|---|
| | 163.061 | | 973.325 | | 2017.6 | |
| speed | Obs-Ref | Error bar | Obs-Ref | Error bar | Obs-Ref | Error bar |
| 50 | −0.071 | 0.046 | −0.434 | 0.032 | −0.830 | 0.010 |
| 500 | −0.052 | 0.044 | −0.417 | 0.027 | −0.770 | 0.010 |
| 1000 | −0.023 | 0.048 | −0.390 | 0.029 | −0.700 | 0.010 |
| 2000 | −0.018 | 0.059 | −0.358 | 0.036 | −0.610 | 0.011 |
| 3000 | −0.003 | 0.059 | −0.368 | 0.033 | −0.580 | 0.011 |
| 5000 | −0.033 | 0.067 | −0.433 | 0.039 | −0.580 | 0.013 |
| 7000 | −0.176 | 0.089 | −0.667 | 0.054 | −0.780 | 0.016 |
| 10000 | −0.146 | 0.068 | −0.720 | 0.044 | −0.790 | 0.027 |
| 15000 | −0.395 | 0.070 | −1.249 | 0.043 | −1.350 | 0.026 |
| 20000 | −0.406 | 0.109 | −1.601 | 0.071 | −1.600 | 0.031 |

In some embodiments, the interpolating step may be performed using probabilistic methods, such as those described in GB2405991 and *Calibration and Interpolation by John Skilling; AIP Conference Proceedings* 872, 321 (2006), the contents of which are herein incorporated by reference.

Methods according to the invention enable a user to construct a calibration curve for any scan speed without having to perform a calibration experiment at that scan speed. Advantageously, this can reduce the time it takes to calibrate a mass spectrometer, leaving more time available in the day to acquire experimental data.

To summarise, methods of the invention are an improvement over existing methods because calibration curves can be constructed for any given scan speed from data that has been obtained using a discrete number of scan speeds, e.g. five or ten scan speeds as per the described embodiments.

When used herein the term "low scan speed" is intended to mean scan speeds in the range 5 Da/e/s to 5000 Da/e/s. The term "high scan speed" is intended to mean any scan speed greater than 5000 Da/e/s.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A method of calibrating a mass spectrometer comprising:

experimentally determining the mass to charge ratios of a plurality of chemical compounds in a reference standard using a mass spectrometer configured to scan ions at a first scan speed;

experimentally determining the mass to charge ratios of said plurality of chemical compounds in said reference standard using a mass spectrometer configured to scan ions at a second scan speed;

generating sets of data corresponding to each chemical compound, each set of data comprising the experimentally determined mass to charge ratios and the first and second scan speeds;

interpolating from the sets of data a mass to charge ratio for each chemical compound at a scan speed different from the first and second scan speeds; and constructing a calibration curve using the mass to charge ratios interpolated from the sets of data, wherein the interpolating step is performed using probabilistic methods.

2. A method according to claim 1, comprising:

experimentally determining the mass to charge ratios of said plurality of chemical compounds in said reference standard using a mass spectrometer configured to scan ions at a third scan speed;

generating sets of data corresponding to each chemical compound, each set of data comprising the experimentally determined mass to charge ratios and the first, second and third scan speeds;

interpolating from the sets of data a mass to charge ratio for each chemical compound at a scan speed different from the first, second and third scan speeds; and constructing a calibration curve using the mass to charge ratios interpolated from the sets of data.

3. A method according to claim 1, wherein the calibration curve is constructed using probabilistic methods.

4. A method according to claim 1 comprising experimentally determining the mass to charge ratios of at least three chemical compounds in the reference standard at each scan speed.

5. A mass spectrometer having associated therewith a computer for performing data analysis functions of data produced by the mass spectrometer, the computer performing the method of claim 1.

6. A mass spectrometer according to claim 5 comprising a quadrupole mass analyser or an ion trap mass analyser.

* * * * *